(12) United States Patent
Ikegami

(10) Patent No.: US 7,677,288 B2
(45) Date of Patent: Mar. 16, 2010

(54) PNEUMATIC TIRE

(75) Inventor: Tetsuo Ikegami, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 12/395,270

(22) Filed: Feb. 27, 2009

(65) Prior Publication Data

US 2009/0301628 A1    Dec. 10, 2009

(30) Foreign Application Priority Data

Jun. 4, 2008    (JP) .............................. 2008-146786

(51) Int. Cl.
*B60C 15/00* (2006.01)
*B60C 15/06* (2006.01)

(52) U.S. Cl. ...................... 152/539; 152/541; 152/546; 152/552; 152/554; 152/555

(58) Field of Classification Search ................ 152/539, 152/541, 542, 543, 546, 547, 548, 550, 552, 152/554, 555
See application file for complete search history.

(56) References Cited

U.S. PATENT DOCUMENTS 4,934,431 A * 6/1990 Agari et al. ................ 152/543

FOREIGN PATENT DOCUMENTS

| JP | 55-132312 | * | 10/1980 |
|---|---|---|---|
| JP | A 57-18503 | | 1/1982 |
| JP | A 58-93605 | | 6/1983 |
| JP | A 64-63402 | | 3/1989 |
| JP | A 2-286406 | | 11/1990 |
| JP | A 7-117420 | | 5/1995 |
| JP | 2001-146105 | * | 5/2001 |
| JP | B2 3426278 | | 7/2003 |
| JP | 2004-42736 | * | 2/2004 |
| JP | 2005-212692 | * | 8/2005 |
| JP | 2006-175892 | * | 7/2006 |
| JP | A 2008-174167 | | 7/2008 |

* cited by examiner

*Primary Examiner*—Justin Fischer
(74) *Attorney, Agent, or Firm*—Greer, Burns & Crain, Ltd.

(57) ABSTRACT

Provided is a pneumatic tire securing better driving stability and having enhanced load stability. Carcass plies are configured on respective two plies, and the direction of the cords of the two carcass plies crosses over each other and is set at an angle of 75 to 88° to the tire circumferential direction. A first filler rubber is included in each wound-up portion of the carcass plies, and a cord reinforcement layer is arranged on an outer side of the first filler rubber in the tire width direction. A second filler rubber is arranged on an outer side of each wound-up portion of the carcass plies in the tire width direction. Out of the two carcass plies, the carcass ply located on an outer side of the tire has its wound-up end part overlaping an outer side of a main body portion of the carcass plies. A specification is given to a relationship among the height of the wound-up end part of the carcass ply on the outer side of the tire, the height of an uppermost end of the second filler rubber, the height of an uppermost end of the first filler rubber, and the height of an uppermost end of the cord reinforcement layer.

8 Claims, 1 Drawing Sheet

PNEUMATIC TIRE

FIELD OF THE INVENTION

The present invention relates to a pneumatic tire securing better driving stability and having enhanced load durability.

DESCRIPTION OF THE PRIOR ART

In general, for the purpose of securing driving stability of tires, a wide-ranging study has been carried out to specify physical properties of rubbers for the tread portion and physical properties of cords for the belt layer. However, recent developments in speed and performance of vehicles have made it more difficult to meet demands for improved driving stability only with improvements made in physical properties of rubbers for the tread portion and physical properties of cords for the belt layer. Against this background, in addition to the above measures, various measures have been taken for increasing the case rigidity of the tire in recent years.

One of the measures is development of a pneumatic radial tire with a so-called half radial structure, in which a case rigidity is increased as follows. The carcass is configured of two carcass plies. Carcass cords are inclined to the tire radial direction in each carcass ply. The cords of one carcass ply cross over the cords of the other carcass ply. In addition, specifications are given to the wind-up height of each carcass ply, the hardness and height of the bead filler, and the like. (see Japanese Patent No. 3426278, for example)

In addition, for the purpose of further meeting the demands for improvements in driving stability, an additional cord reinforcement layer is placed in the tire side portion. However, the placement of the additional cord reinforcement layer brings about a new problem of the decrease in load durability.

SUMMARY OF THE INVENTION

An object of the present invention is to solve the above-described conventional problems, and to provide a pneumatic tire securing better driving stability and having enhanced load durability.

A pneumatic tire according to the present invention for achieving the object is a pneumatic tire in which end parts of respective two carcass plies are wound up around each of bead cores respectively embedded in paired left and right bead parts from an inner side of the tire to an outer side of the tire, and in which a direction where cords extend in one of the two carcass plies crosses over a direction where cords extend in the other of the two carcass plies. The pneumatic tire is characterized in that: the direction where the cords extend in each of the two carcass plies is set at an angle of 75 to 88° to a tire circumferential direction; a first filler rubber and a cord reinforcement layer are included in each wound-up portion consisting of the carcass plies, the cord reinforcement layer being arranged on an outer side of the first filler rubber in a tire width direction; a second filler rubber is arranged on an outer side of each wound-up portion consisting of the carcass plies in the tire width direction; out of the two carcass plies, the carcass ply located on the outer side of the tire has a configuration in which a wound-up end part of the carcass ply is wound up to such a position as to cause the wound-up end part to overlap the outer side of a main body portion of the carcass ply; and a relationship among a height 2TUH of the wound-up end part of the carcass ply located on the outer side of the tire in a tire radial direction, a height 2FLH of an uppermost end of the second filler rubber in the tire radial direction, a height 1FLH of an uppermost end of the first filler rubber in the tire radial direction, and a height RFH of an uppermost end of the cord reinforcement layer in the tire radial direction is established to satisfy 2TUH>2FLH>1FLH>RFH.

Furthermore, it is desirable that the pneumatic tire according to the present invention which has the above configuration should be configured as described in the following items (1) to (5).

(1) Each of the heights 2TUH, 2FLH, 1FLH and RFH in the tire radial direction has the following relationship with a height SH of a cross-section of the tire, $2TUH=(0.70 \text{ to } 0.80)SH$ $2FLH=(0.50 \text{ to } 0.65)SH$ $1FLH=(0.40 \text{ to } 0.55)SH$ $RFH=(0.30 \text{ to } 0.45)SH.$ (2) Out of the two carcass plies, a carcass ply located on an inner side of the tire has its wound-up end part whose height 1TUH in the tire radial direction is set lower than the height 1FLH of the uppermost end of the first filler rubber in the tire radial direction.

(3) The material for the cords in each of the two carcass plies is made of an organic fiber selected from rayon, nylon and the like, as well as the material for the cords in the cord reinforcement layer is made of a steel.

(4) The direction where the cords extend in the cord reinforcement layer is set at an angle of 15 to 60° to the tire circumferential direction.

(5) The JIS-hardness (A type) of each of the first filler rubber and the second filler rubber is 72 to 96.

The present invention makes it possible to secure a high-level casing rigidity by employing the advantages of the half radial structure up to the maximum for the following reasons. The carcass plies are configured of the two respective two plies, and the direction where the cords extend in one of the two carcass plies crosses over the direction where the cords extend in the other of the two carcass plies. The direction where the cords extend in each of the two carcass plies is set at an angle of 75 to 88° to the tire circumferential direction. Out of the two carcass plies, a carcass ply located on the outer side of the tire has its wound-up end part which is wound up in a way that the wound-up end part overlaps the main body portion of the carcass ply. The height 2TUH of the wound-up end part in the tire radial direction is set higher than the height 1FLH of the first filler rubber in the tire radial direction. Thereby, the overlap portion in which the main bodies of the respective two carcass plies extending beyond 1FLH up to 2TUH overlap the wound-up portion of the carcass ply located on the outer side of the tire is substantially configured of the three carcass plies. In this respect, the direction where the cords extend in one of the three carcass plies, the direction where the cords extend in another of the three carcass plies 4, 5, 5, and the direction where the cords extend in the other of the three carcass plies cross over one another.

Furthermore, the cord reinforcement layer is arranged contiguous to the outer side of the first filler rubber in the tire width direction, and the height RFH of the cord reinforcement layer in the tire radial direction is limited to be lower than the height 1FLH of the first filler rubber in the tire radial direction. This height arrangement prevents the cord reinforcement layer and the main body portion of the carcass ply from contacting each other directly. This prevents reduction in the durability which would otherwise occur due to interference between the cords in the cord reinforcement layer and the cords in the main body portion of the carcass ply. In addition, because the insufficiency of the casing rigidity as a result of the limitation imposed on the height RFH of the cord reinforcement layer is compensated by the placement of the second filler rubber, it is possible for the pneumatic tire according to the present invention to reconcile the driving stability with the load durability at a higher level.

BEST MODES FOR CARRYING OUT THE INVENTION

Figure 1:
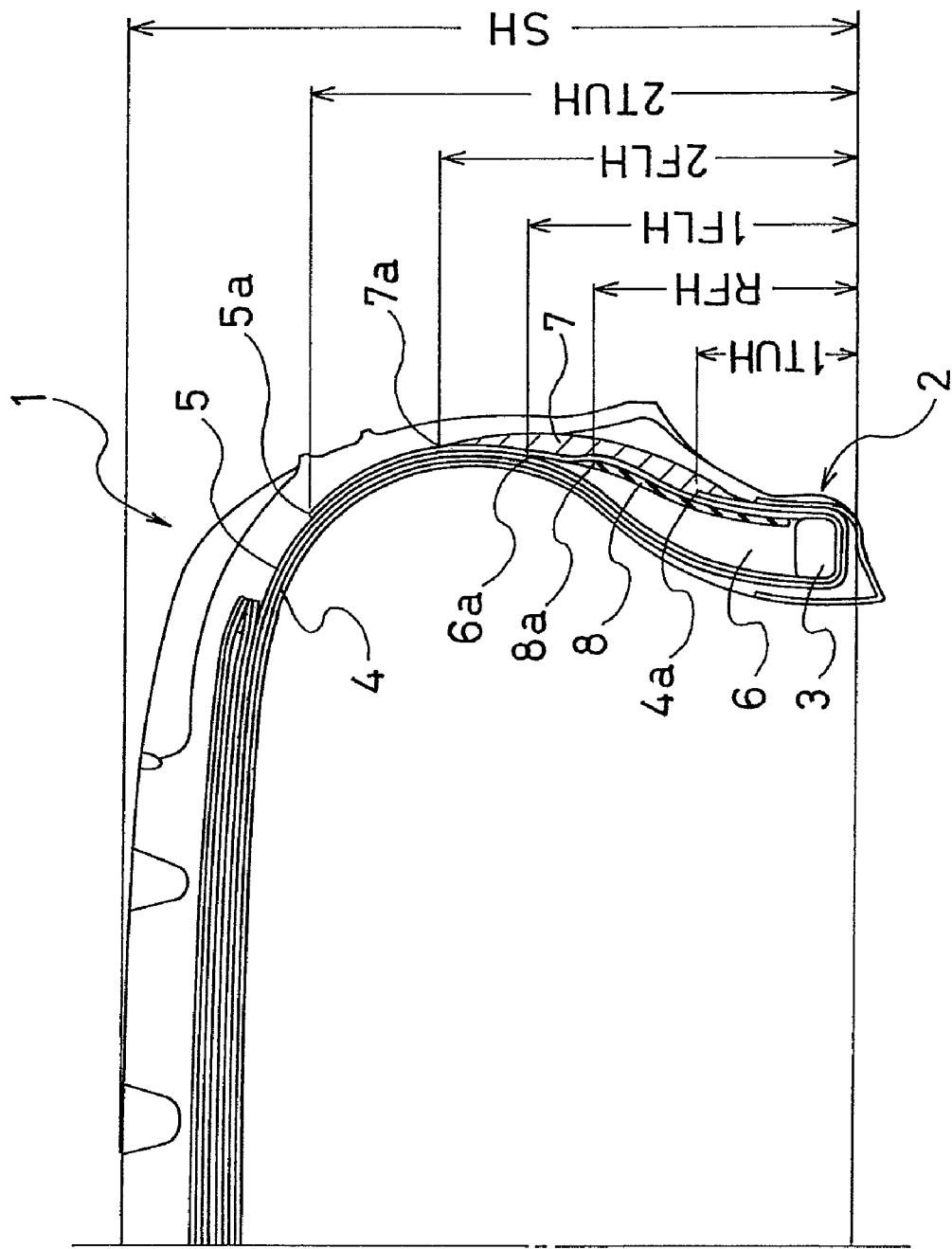
FIG. 1 is a half cross-sectional view showing an example of a pneumatic tire according to an embodiment of the present invention.

Detailed descriptions will be provided hereinbelow for an embodiment of the present invention by referring to the attached drawings.

FIG. 1 is a half cross-sectional view showing an example of a pneumatic tire according to the embodiment of the present invention. In FIG. 1, a pneumatic tire 1 is configured as follows. Carcass plies 4, 5 are laid between paired left and right bead parts 2. The direction where the cords extend in one of the carcass plies 4, 5 crosses over the direction where the cords extend in the other of the carcass plies 4, 5. Bead cores 3 are embedded in the respective bead parts 2. End parts 4a, 5a of the respective two carcass plies 4, 5 are wound up around each bead core 3 from an inner side of the tire to an outer side of the tire.

In the present invention, the direction where the cords extend in each of the two carcass plies 4, 5 is set at an angle of 75 to 88° to the tire circumferential direction. A first filler rubber 6 and a cord reinforcement layer 8 are included in each wound-up portion consisting of the carcass plies 4, 5. The cord reinforcement layer 8 is arranged on an outer side of the first filler rubber 6 in the tire width direction. Furthermore, a second filler rubber 7 is arranged contiguous to each wound-up portion consisting of the carcass plies 4, 5 on the outer side of the wound-up portion in the tire width direction.

Moreover, out of the two carcass plies 4, 5, the carcass ply 5 located on the outer side of the tire has the wound-up end part 5a wound up to a height at which the wound-up end part 5a overlaps a main body portion of the carcass ply 5. A relationship among a height 2TUH of this wound-up end part 5a in the tire radial direction, a height 2FLH of an uppermost end 7a of the second filler rubber 7 in the tire radial direction, a height 1FLH of an uppermost end 6a of the first filler rubber 6 in the tire radial direction, and a height RFH of an uppermost 8a of the cord reinforcement layer 8 in the tire radial direction is established to satisfy 2TUH>2FLH>1FLH>RFH.

As described above, the direction where the cords extend in one of the carcass plies 4, 5 and the direction where the cords extend in the other of the carcass plies 4, 5 cross over each other, and each of the two directions is set at an angle of 75 to 88° to the tire circumferential direction. In addition, out of the two carcass plies 4, 5, the carcass ply 5 located on the outer side of the tire has the wound-up end part 5a which overlaps the main body portion of the carcass ply 5 in a way that the height 2TUH of the wound-up end part 5a in the tire radial direction exceeds the height 1FLH of the uppermost end 6a of the first filler rubber 6 in the tire radial direction. Thereby, the overlap portion in which main bodies of the respective two carcass plies 4, 5 extending beyond 1FLH up to 2TUH overlap the wound-up portion of the carcass ply 5 located on the outer side of the tire is substantially configured of the three carcass plies 4, 5, 5. In this respect, the direction where the cords extend in one of the three carcass plies 4, 5, 5, the direction where the cords extend in another of the three carcass plies 4, 5, 5, and the direction where the cords extend in the other of the three carcass plies 4, 5, 5 cross over one another. This configuration makes it possible to secure a high-level casing rigidity by employing the advantages of the half radial structure up to the maximum.

Such a high-level casing rigidity cannot be obtained in a case where, out of the two carcass plies 4, 5, the carcass ply 4 located on the inner side of the tire has the wound-up end part 4a which is wound up to overlap the main body portion of the carcass ply. This is because the direction where the cords incline in the wound-up portion of the carcass ply 4 coincides with the direction where the cords incline in the main body portion of the carcass ply so that the direction where the cords incline in one of the two adjacent carcass ply does not cross over the direction where the cords incline in the other of the two adjacent carcass ply.

Furthermore, the cord reinforcement layer 8 is arranged contiguous to the outer side of the first filler rubber 6 in the tire width direction, and the height RFH of the uppermost end 8a of the cord reinforcement layer 8 in the tire radial direction is limited to be lower than the height 1FLH of the uppermost end 6a of the first filler rubber 6 in the tire radial direction. This height arrangement prevents the cord reinforcement layer 8 and the main body portion of the carcass ply 5 from contacting each other directly. This prevents reduction in the durability which would otherwise occur due to interference between the cords in the cord reinforcement layer 8 and the cords in the main body portion of the carcass ply 5. In addition, because the insufficiency of the casing rigidity as a result of the limitation imposed on the height RFH of the cord reinforcement layer 8 is compensated by the placement of the second filler rubber 7, it is possible to reconcile the driving stability with the load durability at a higher level.

In this respect, when the direction where the cords extend in each of the carcass plies 4, 5 is at an angle less than 75° to the tire circumferential direction, the tire casing rigidity becomes too high so that the load durability decreases. When the direction where the cords extend in each of the carcass plies 4, 5 is at an angle exceeding 88°, the tire casing rigidity fall short so that the driving stability decreases.

In the present invention, it is desirable that a relationship of each of the heights 2TUH, 2FLH, 1FLH and RFH in the tire radial direction with a height SH of the tire cross-section should be established as follows. Specifically, the height 2TUH of the wound-up end part 5a of the carcass ply 5 in the tire radial direction is set 0.70 to 0.80 times as high as the height SH of the tire cross-section. It is desirable that the height 2TUH should be set 0.72 to 0.78 times as high as the height SH. The height 2FLH of the uppermost end 7a of the second filler rubber 7 in the tire radial direction is set 0.50 to 0.65 times as high as the height SH of the tire cross-section. It is desirable that the height 2FLH should be set 0.55 to 0.60 times as high as the height SH. The height 1FLH of the uppermost end 6a of the first filler rubber 6 in the tire radial direction is set 0.40 to 0.55 times as high as the height SH of the tire cross-section. It is desirable that the height 1FLH should be set 0.47 to 0.52 times as high as the height SH. The height RFH of the uppermost end 8a of the cord reinforcement layer 8 in the tire radial direction is set 0.30 to 0.45 times as high as the height SH of the tire cross-section. It is desirable that the height RFH should be set 0.35 to 0.40 times as high as the height SH.

In this respect, when 2TUH is less than 0.70 times as high as SH, the tire casing rigidity falls short so that no better driving stability is available. When 2TUH is more than 0.80 times as high as SH, the load durability decreases. In addition, when 2FLH is less than 0.50 times as high as SH, it is difficult to obtain better driving stability. When 2FLH is more than 0.65 times as high as SH, the load durability decreases. Furthermore, when 1FLH is less than 0.40 times as high as SH, the casing rigidity falls short so that the driving stability decreases. When 1FLH is more than 0.55 times as high as SH, the casing rigidity becomes too high so that the ride comfort decreases. Moreover, when RFH is less than 0.30 times as high as SH, the casing rigidity falls short so that the driving stability decreases.

It is desirable that, out of the two carcass plies 4, 5, the carcass ply 4 located on the inner side of the tire should have the wound-up end part 4a whose height 1TUH in the tire radial direction is set lower than the height 1FLH of the uppermost end 6a of the first filler rubber 6 in the tire radial direction. This setting prevents the wound-up portion of the carcass ply 4 from directly contacting the main body portion of the carcass ply 5. This prevention makes it possible to prevent reduction in durability which would otherwise occur due to interference between the cords in the wound-up portion of the carcass ply 4 and the main body portion of the carcass ply 5.

No specific restriction is imposed on the material for the cords constituting each of the carcass plies 4, 5 and the cord reinforcement layer 8 in the pneumatic tire 1 according to the present invention. However, it is desirable that the material for the cords constituting each of the two carcass plies 4, 5 should be made of an organic fiber selected from rayon, nylon and the like, as well as that the material for the cords constituting the cord reinforcement layer 8 is made of a steel.

In addition, no specific restriction is imposed on the direction where the cords extend in the cord reinforcement layer as well. However, it is desirable that the direction where the cords extend in the cord reinforcement layer 8 should be set at an angle of 15 to 60° to the tire circumferential direction. It is more desirable that the direction should be set at 18 to 24° to the tire circumferential direction. This makes it possible to secure a higher casing rigidity and concurrently to check the load durability from decreasing.

Furthermore, it is desirable that the JIS-hardness (A type) of each of the first filler rubber 6 and the second filler rubber 7 should be set at 72 to 96. It is more desirable that the JIS-hardness (A type) thereof should be set at 88 to 94. This makes it possible to reconcile the driving stability with the load durability at a higher level. Specifically, when the JIS-hardness (A type) thereof is less than 72, the driving stability decreases. When the JIS-hardness (A type) is more than 96, the load durability decreases. In the present invention, the JIS-hardness (A type) thereof is defined as the hardness of a rubber which is measured by use of the type A durometer in accordance with JIS K6253 at a temperature of 25° C.

As described above, the carcass plies are configured of two plies, and the direction where the cords extend in one of the two carcass plies crosses over the direction where the cords extend in the other of the two carcass plies; the direction where the cords extend in each of the two carcass plies is set at an angle of 75 to 88° to the tire circumferential direction; the first filler rubber is included in each wound-up portion consisting of the carcass plies, and the cord reinforcement layer is arranged on the outer side of the first filler rubber in the tire width direction; the second filler rubber is arranged on the outer side of each wound-up portion consisting of the carcass plies in the tire width direction; out of the two carcass plies, the carcass ply located on the outer side of the tire has its wound-up end part which is wound up to such a position as to cause the wound-up end part to overlap the outer side of the main body portion of the carcass plies; and a specification is given to the relationship among the height of the wound-up end part of the carcass ply located on the outer side of the tire, the height of the uppermost end of the second filler rubber, the height of the uppermost end of the first filler rubber, and the height of the uppermost end of the cord reinforcement layer. Thereby, the pneumatic tire according to the present invention secures better driving stability and has enhanced load durability. Consequently, the pneumatic tire according to the present invention can be widely adopted for the purpose of reconciling the driving stability with the load durability in a pneumatic tire adopting the half radial structure.

Embodiment

A conventional tire (as conventional example) and a comparative tire (as comparative example 1) each having no second filler rubber arranged therein, as well as tires according to the present invention (examples 1 to 5) and the other comparative tire (as comparative example 2) each having the second filler rubber arranged therein with the specification for the second filler rubber being different from one to another as shown in Table 1 were produced with a 245/40R18 tire size, with a tire basic structure shown in FIG. 1, and by use of the same mold.

For each of these 8 types of tires, its driving stability and load durability were evaluated by use of the following test methods.

[Driving Stability]

Each type of tire was inflated to an air pressure of 230 kPa, and was mounted on the front and rear wheels of a sports car made in Japan. Afterward, the sports car ran in a test course with an asphalt road surface at an average speed of 140 km/h. For each of the 8 types of tires, a skilled test driver evaluated its driving stability on a five-point scale with a sensory evaluation method. For each type of tire, a result of the evaluation is shown in Table 1. A larger value indicates better driving stability.

[Load Durability]

Each type of tire was inflated to an air pressure of 180 kPa. Thereafter, by use of an indoor drum test machine, each type of tire was caused to run at a traveling speed of 81 km/h (constant) with 100% of a maximum load under JATMA standards being applied to the tire for 24 hours, subsequently with the applied load being increased by 15% for each 4 hours, until the tire broke. Thereby, a total traveling distance that each type of tire ran until the tire broke was measured. For each type of tire, Table 1 shows its measurement result by use of an index indicating the relative level of its travelling distance compared with the travelling distance of the conventional tire scored at 100. A larger value means better durability.

TABLE 1

| | | CONVENTIONAL EXAMPLE | COMPARATIVE EXAMPLE 1 | EXAMPLE 1 | EXAMPLE 2 | EXAMPLE 3 | EXAMPLE 4 | EXAMPLE 5 | COMPARATIVE EXAMPLE 2 |
|---|---|---|---|---|---|---|---|---|---|
| ANGLE OF CARCASS CORDS | | 85 | 85 | 75 | 85 | 85 | 85 | 88 | 90 |
| PERCENTAGE COMPARED TO HEIGHT SH OF CROSS-SECTION OF TIRE | 2TUH (%) | 75 | 75 | 75 | 75 | 75 | 75 | 75 | 75 |
| | 1FLH (%) | 40 | 48 | 48 | 48 | 48 | 48 | 48 | 48 |
| | 2FLH (%) | — | — | 60 | 50 | 60 | 65 | 60 | 60 |
| | RFH (%) | 50 | 60 | 40 | 40 | 40 | 40 | 40 | 40 |
| EVALUATION | DRIVING STABILITY (EVALUATION SCORE) | 3 | 4 | 5 | 4 | 5⁻ | 5 | 3⁺ | 2 |
| | LOAD DURABILITY (INDEX) | 100 | 92 | 101 | 114 | 108 | 105 | 120 | 131 |

It is learned from Table 1 that the driving stability and load durability of each tire according to the present invention were enhanced in a well-balanced manner in comparison with the conventional tire. Note that the tire according to the comparative example 1 whose 1FLH and RHF were larger than those of the conventional tire was observed as having decreased load durability although having increased driving stability, in comparison with the conventional tire. In addition, the tire according to the comparative example 2 in which the second filler rubber was arranged exhibited decreased driving stability in comparison with the conventional tire, because the angle of the carcass cords to the tire circumferential direction was set at 90°.

What is claimed is:

1. A pneumatic tire in which end parts of respective two carcass plies are wound up around each of bead cores respectively embedded in paired left and right bead parts from an inner side of the tire to an outer side of the tire, and in which a direction where cords extend in one of the two carcass plies crosses over a direction where cords extend in the other of the two carcass plies, wherein the direction where the cords extend in each of the two carcass plies is set at an angle of 75 to 88° to a tire circumferential direction, a first filler rubber and a cord reinforcement layer are included in each wound-up portion consisting of the carcass plies, the cord reinforcement layer being arranged on an outer side of the first filler rubber in a tire width direction, a second filler rubber is arranged on an outer side of each wound-up portion consisting of the carcass plies in the tire width direction, out of the two carcass plies, the carcass ply located on the outer side of the tire has a configuration in which a wound-up end part of the carcass ply is wound up to such a position as to cause the wound-up end part to overlap an outer side of a main body portion of the carcass ply, a relationship among a height 2TUH of the wound-up end part of the carcass ply located on the outer side of the tire in a tire radial direction, a height 2FLH of an uppermost end of the second filler rubber in the tire radial direction, a height 1FLH of an uppermost end of the first filler rubber in the tire radial direction, and a height RFH of an uppermost end of the cord reinforcement layer in the tire radial direction is established to satisfy 2TUH>2FLH>1FLH>RFH, and each of the heights 2TUH, 2FLH, 1FLH and RFH in the tire radial direction has the following relationship with a height SH of a cross-section of the tire, $2TUH = (0.70 \text{ to } 0.80)SH$ $2FLH = (0.50 \text{ to } 0.65)SH$ $1FLH = (0.40 \text{ to } 0.55)SH$ $RFH = (0.30 \text{ to } 0.45)SH.$ 2. The pneumatic tire according to claim 1, wherein out of the two carcass plies, a carcass ply located on an inner side of the tire has its wound-up end part whose height 1TUH in the tire radial direction is set lower than the height 1FLH of the uppermost end of the first filler rubber in the tire radial direction.

3. The pneumatic tire according to claim 1, wherein a material for cords in each of the two carcass plies is made of an organic fiber selected from rayon, nylon and the like, as well a material for the cords in the cord reinforcement layer is made of a steel.

4. The pneumatic tire according to claim 2, wherein a material for cords in each of the two carcass plies is made of an organic fiber selected from rayon, nylon and the like, as well a material for the cords in the cord reinforcement layer is made of a steel.

5. The pneumatic tire according to claim 1, wherein a direction where cords extend in the cord reinforcement layer is set at an angle of 15 to 60° to the tire circumferential direction.

6. The pneumatic tire according to claim 2, wherein a direction where cords extend in the cord reinforcement layer is set at an angle of 15 to 6° to the tire circumferential direction.

7. The pneumatic tire according to claim 1, wherein a JIS-hardness (A type) of each of the first filler rubber and the second filler rubber is set at 72 to 96.

8. The pneumatic tire according to claim 2, wherein a JIS-hardness (A type) of each of the first filler rubber and the second filler rubber is set at 72 to 96.

* * * * *